United States Patent
Arumugham et al.

(10) Patent No.: US 7,293,191 B1
(45) Date of Patent: Nov. 6, 2007

(54) SYSTEM AND METHOD FOR MANAGING I/O ERRORS IN A STORAGE ENVIRONMENT EMPLOYING ASYMMETRIC DISTRIBUTED BLOCK VIRTUALIZATION

(75) Inventors: Kalaivani Arumugham, Sunnyvale, CA (US); Santosh Rao, Santa Clara, CA (US); Gopal Sharma, San Jose, CA (US); Poonam Dhavale, Sunnyvale, CA (US); Michael Wahl, Georgetown, TX (US); Oleg Kiselev, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 597 days.

(21) Appl. No.: 10/899,195

(22) Filed: Jul. 26, 2004

(51) Int. Cl.
*G06F 11/00* (2006.01)
(52) U.S. Cl. .......................................... 714/5
(58) Field of Classification Search .................. 714/5
See application file for complete search history.

(56) References Cited

U.S. PATENT DOCUMENTS

| | | | |
|---|---|---|---|
| 4,945,474 A | 7/1990 | Elliott et al. | |
| 5,388,254 A | 2/1995 | Betz et al. | |
| 6,446,219 B2 * | 9/2002 | Slaughter et al. | 714/4 |
| 6,453,428 B1 * | 9/2002 | Stephenson | 714/6 |
| 6,457,139 B1 * | 9/2002 | D'Errico et al. | 714/5 |
| 6,487,562 B1 * | 11/2002 | Mason et al. | 707/205 |
| 6,725,331 B1 * | 4/2004 | Kedem | 711/117 |
| 6,829,729 B2 | 12/2004 | Hicks et al. | |
| 6,877,011 B2 * | 4/2005 | Jaskiewicz | 707/102 |
| 6,983,362 B1 * | 1/2006 | Kidder | 713/1 |
| 7,069,468 B1 * | 6/2006 | Olson et al. | 714/7 |
| 7,100,071 B2 * | 8/2006 | Olarig | 714/5 |
| 7,191,304 B1 * | 3/2007 | Cameron et al. | 711/202 |
| 2001/0037473 A1 * | 11/2001 | Masuura et al. | 714/5 |
| 2001/0047482 A1 * | 11/2001 | Harris et al. | 713/200 |
| 2005/0166022 A1 * | 7/2005 | Watanabe | 711/162 |
| 2006/0031270 A1 * | 2/2006 | Nemoto et al. | 707/205 |
| 2007/0016754 A1 * | 1/2007 | Testardi | 711/206 |

* cited by examiner

*Primary Examiner*—Bryce P Bonzo
(74) *Attorney, Agent, or Firm*—Meyertons Hood Kivlin Kowert & Goetzel, P.C.; B. Noël Kivlin

(57) ABSTRACT

A system for managing input/output (I/O) errors in a storage system employing asymmetric distributed block virtualization includes a volume server, a plurality of volume clients, and one or more physical block devices. The volume server aggregates storage in the physical block devices into a logical volume and makes the logical volume accessible to the volume client. A designated route may be used to send I/O requests from the volume client to a physical block device during normal operation. If the volume client loses connectivity on the designated route, the volume client may route an I/O request to the physical block device via an alternate route. In one specific embodiment, the volume client may route an I/O request to the physical block device via the volume server.

24 Claims, 14 Drawing Sheets

Configuration Database

| Volume Client ID | Volume ID | I/O Error Handling Policy | |
|---|---|---|---|
| | | Routing Policy | Detach Policy |
| VC1 | V1 | Default-Only | VC-Initiated |
| VC1 | V3 | Best-Available | VS-Initiated |
| VC2 | V1 | Best-Available | VC-Initiated |
| VC2 | V3 | Default-Only | VS-Initiated |
| VC3 | V2 | Default-Only | VC-Initiated |
| VC3 | V4 | Default-Only | VS-Initiated |
| VC4 | V5 | Best-Available | VS-Initiated |

Configuration Database Entry For I/O Error Handling Policy →

| Volume Client ID | Volume ID | I/O Error Handling Policy | |
|---|---|---|---|
| | | Routing Policy | Detach Policy |
| VC1 | V1 | Default-Only | VC-Initiated |

FIG. 7

Configuration Database ↘

| Volume Client ID | Volume ID | I/O Error Handling Policy | |
|---|---|---|---|
| | | Routing Policy | Detach Policy |
| VC1 | V1 | Default-Only | VC-Initiated |
| VC1 | V3 | Best-Available | VS-Initiated |
| VC2 | V1 | Best-Available | VC-Initiated |
| VC2 | V3 | Default-Only | VS-Initiated |
| VC3 | V2 | Default-Only | VC-Initiated |
| VC3 | V4 | Default-Only | VS-Initiated |
| VC4 | V5 | Best-Available | VS-Initiated |

FIG. 8

Volume Client 130          Cache 910

| Volume | I/O Error Handling Policy |
|---|---|
| V901 | EHP901 |
| V902 | EHP902 |
| V903 | EHP903 |

FIG. 9

SYSTEM AND METHOD FOR MANAGING I/O ERRORS IN A STORAGE ENVIRONMENT EMPLOYING ASYMMETRIC DISTRIBUTED BLOCK VIRTUALIZATION

BACKGROUND OF THE INVENTION

1. Field of the Invention

This invention relates to computer systems and, more particularly, to management of input/output errors in storage environments employing asymmetric distributed block virtualization techniques.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

In such storage environments, an input/output (I/O) operation issued by a data consumer may sometimes result in failure (that is, an I/O error message may be returned to the data consumer instead of an indication of success) due to a variety of reasons. Failures may be caused, for example, by a loss of connectivity between storage devices and the data consumer, a hardware failure at a storage device, or a software failure at some layer in the storage software stack. In general, in response to an I/O error, an effort to determine the source of the error may be made, and corrective action may be taken to repair the storage environment if necessary. The corrective action may include making one or more storage devices unavailable to some data consumers for a period of time. In a storage environment where multiple paths may be available to access a given physical storage device, not all data consumers may need to respond to a given type of I/O error in the same manner, especially in cases where the response may include making some storage unavailable to other data consumers. Requiring that all data consumers use a uniform approach in responding to I/O errors in a complex storage environment may potentially result in suboptimal use of resources.

SUMMARY OF THE INVENTION

Various embodiments of a system for managing input/output (I/O) errors in a storage system employing asymmetric distributed block virtualization are disclosed. In one embodiment, the system includes a volume server, a volume client, and one or more physical block devices. The volume server aggregates storage in the physical block devices into a logical volume and makes the logical volume accessible to the volume client. A designated route may be used to send I/O requests from the volume client to a physical block device during normal operation. If the volume client loses connectivity on the designated route, the volume client may route an I/O request to the physical block device via an alternate route. In one specific embodiment, the volume client may route an I/O request to the physical block device via the volume server.

In another embodiment, the system includes a volume server, a volume client, and a plurality of physical block devices. The volume server aggregates storage in the physical block devices into a mirrored logical volume including a plurality of mirrors, and makes the mirrored logical volume accessible to the volume client. In response to a failure of a write operation on a mirror of the plurality of mirrors, the volume client is configured to send a notification to the volume server. On receiving the notification, the volume server is configured to perform a write verification test on the mirror. For example, the volume server may itself issue a write request to the mirror; if the write request succeeds, the volume server may determine that the mirror is operable for further write operations. If the write verification test fails, the volume server may initiate a detach operation on the mirror.

Several other embodiments are also disclosed. In one embodiment, the system includes a volume server, a plurality of volume clients, and one or more physical block devices. The volume server aggregates storage in the physical block devices into a logical volume and makes the logical volume accessible to the volume clients for I/O operations. If an I/O request directed at the logical volume by a volume client results in an I/O error, a set of rules constituting an I/O error handling policy may be used to determine the response of the volume client to the I/O error. For a specific type of I/O error, an I/O error handling policy may be configured to use one of several response options, where the options may differ in their impact on subsequent I/O requests by volume clients and in the amount of network and processing resources consumed. A first volume client may respond to an I/O error using a first I/O error handling policy, and a second volume client may respond to an I/O error using a second, different I/O error handling policy. In some embodiments, the two I/O error handling policies may differ in a routing policy (rules used to route I/O requests in response to a loss of connectivity). In other embodiments, the two I/O error handling policies may differ in a detach policy (rules used to initiate a detach operation, if required, on a mirror of a mirrored logical volume).

BRIEF DESCRIPTION OF THE DRAWINGS

FIG. 7 illustrates an example of a configuration database entry for an I/O error handling policy for one specific embodiment.

FIG. 8 shows an example of a set of I/O error handling policy entries for various logical volumes and volume clients in a configuration database according to one embodiment.

FIG. 9 is a block diagram illustrating an example of a cache maintained by a volume client in one embodiment, containing encodings of I/O error handling policies.

Figure 1:
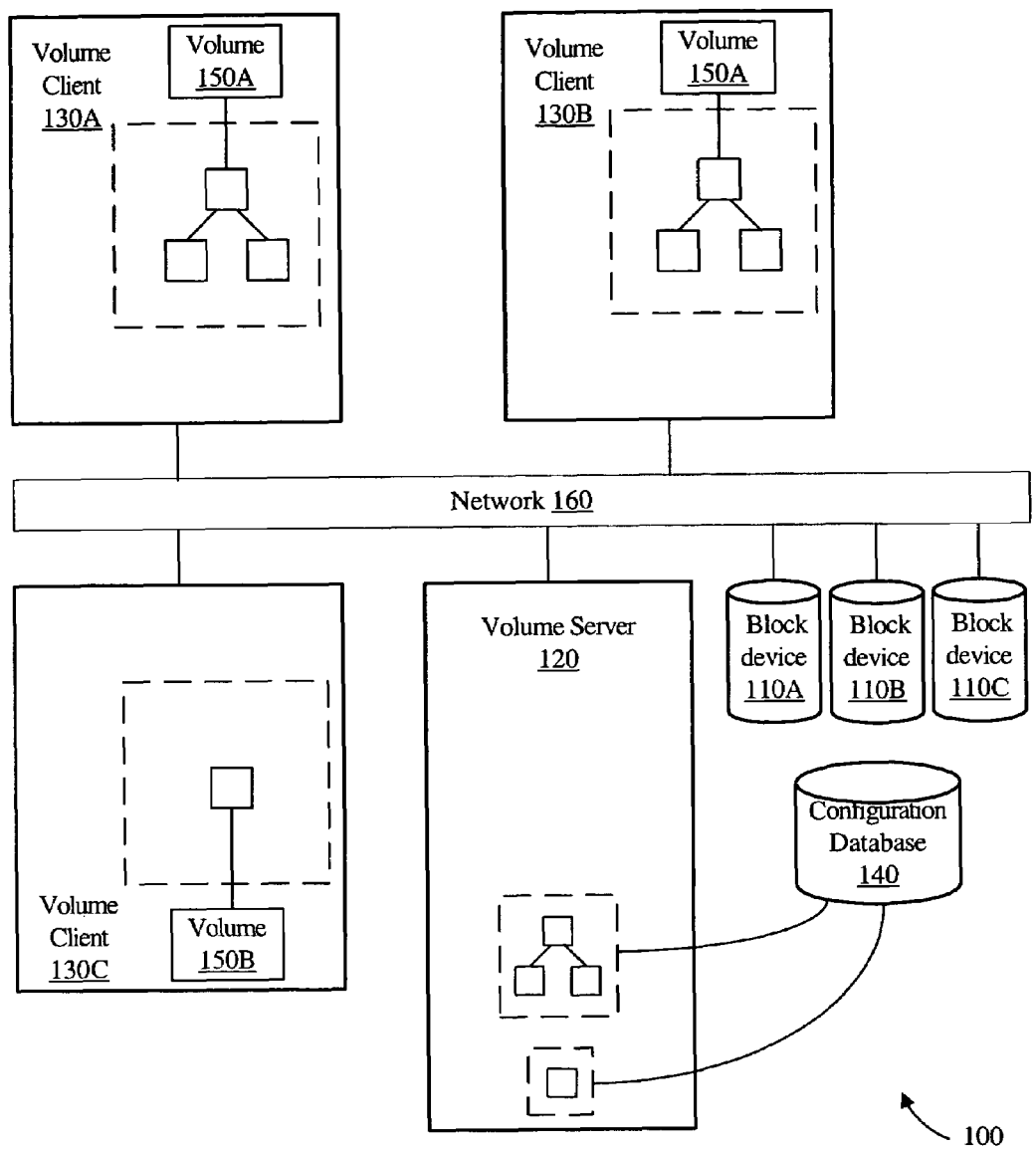
FIG. 1 is a block diagram illustrating one embodiment of a logical volume-based block virtualization system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a logical volume-based block virtualization system 100 according to one embodiment. In the illustrated embodiment, system 100 includes a plurality of block devices 110A-C (collectively, block devices 110) as well as a volume server 120 and a plurality of volume clients 130A-C (collectively, volume clients 130), coupled to a network 160. Volume clients 130 may also be referred to herein as hosts 130. Volume server 120 is configured to have access to configuration information in a configuration database 140. Volume clients 130A and 130B are shown as having access to a volume 150A. That is, each of volume clients 130A may request or perform input/output (I/O) operations on volume 150A. Volume 150A is associated with one or more logical storage objects, illustrated as a tree of logical objects. Volume client 130C is shown as having access to a volume 150B. As illustrated, different volume clients 130 may have access to different sets of volumes 150; not all volume clients need access to the same volumes. Further discussion of the manner in which different sets of volumes may be distributed among volume clients is provided below.

Generally speaking, a block device 110 may comprise a hardware or software entity that provides a collection of linearly addressed data blocks that can be read or written. For example, in one embodiment a block device 110 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. Block devices presented by physical storage devices may also be referred to as physical block devices. In some embodiments, a physical block device may be presented by a storage device residing on a storage network, such as a Small Computer System Interface (SCSI) device presented to a Storage Area Network (SAN) using a Fibre Channel, Infiniband, or Internet Protocol (IP) interface. In some embodiments, a block device 110 may also be a logical or virtual storage device resulting from a mapping of blocks of one or more physical storage devices, as described in greater detail below. Such block devices may also be referred to as logical or virtual block devices.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 110 may read or write blocks directly to the device, bypassing any file system that may be in use. In some embodiments, a block device 110 presented by an operating system for use by a consumer may present relatively few primitives through which the device may be manipulated. For example, in one embodiment a block device 110 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 110 that are physical storage devices, such as disks or tape drives, may be configured to present some form of SCSI interface, though other interfaces are possible and contemplated.

A volume manager, such as volume server 120, may introduce virtualization of blocks, creating some number of virtualized block devices out of one or more physical or logical block devices. (In some embodiments, physical storage devices such as disk arrays may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Generally speaking, a volume 150A or 150B (collectively referred to as volumes 150) may comprise a virtualized block device that may be presented directly for use by a block device consumer, i.e., a file system or an application (such as a database application, for example) that can directly use block devices. Volumes 150 may also be referred to herein as logical volumes. A given volume 150 may be associated with several logical or physical block devices as a result of the block device virtualization just described. Each block device included in the logical organization of a given volume or virtualized block device may be referred to as a storage object or logical storage object. As noted previously, a given virtualized block device may include multiple layers of virtualization, depicted in FIG. 1 as a tree of storage objects.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. Such a disk driver may be generally unaware of block virtualization and may in some instances present a barrier to using some virtualization techniques, whereas a volume implementing various block virtualization features may be directly accessible by a consumer without the issues presented by such disk drivers.

Volume server 120 (which may also be referred to herein as a virtualization coordinator or a volume coordinator) may provide functions such as configuration management of virtualized block devices and distributed coordination of block device virtualization. For example, in one embodiment volume server 120 may be aware of the type and quantity of physical storage devices, such as block devices 110, that are available within system 100. In response to a request to configure a virtual block device, for example according to a desired set of virtualization features, volume server 120 may be configured to build a volume description that describes how a collection of storage objects compliant with the desired features maps to underlying physical block devices. The volume description identifying a particular volume 150 may be distributed to one or more volume clients 130. In one embodiment, such a volume description may be a tree of storage objects as illustrated in FIG. 1 and described in greater detail below in conjunction with the description of FIG. 2.

Figure 2:
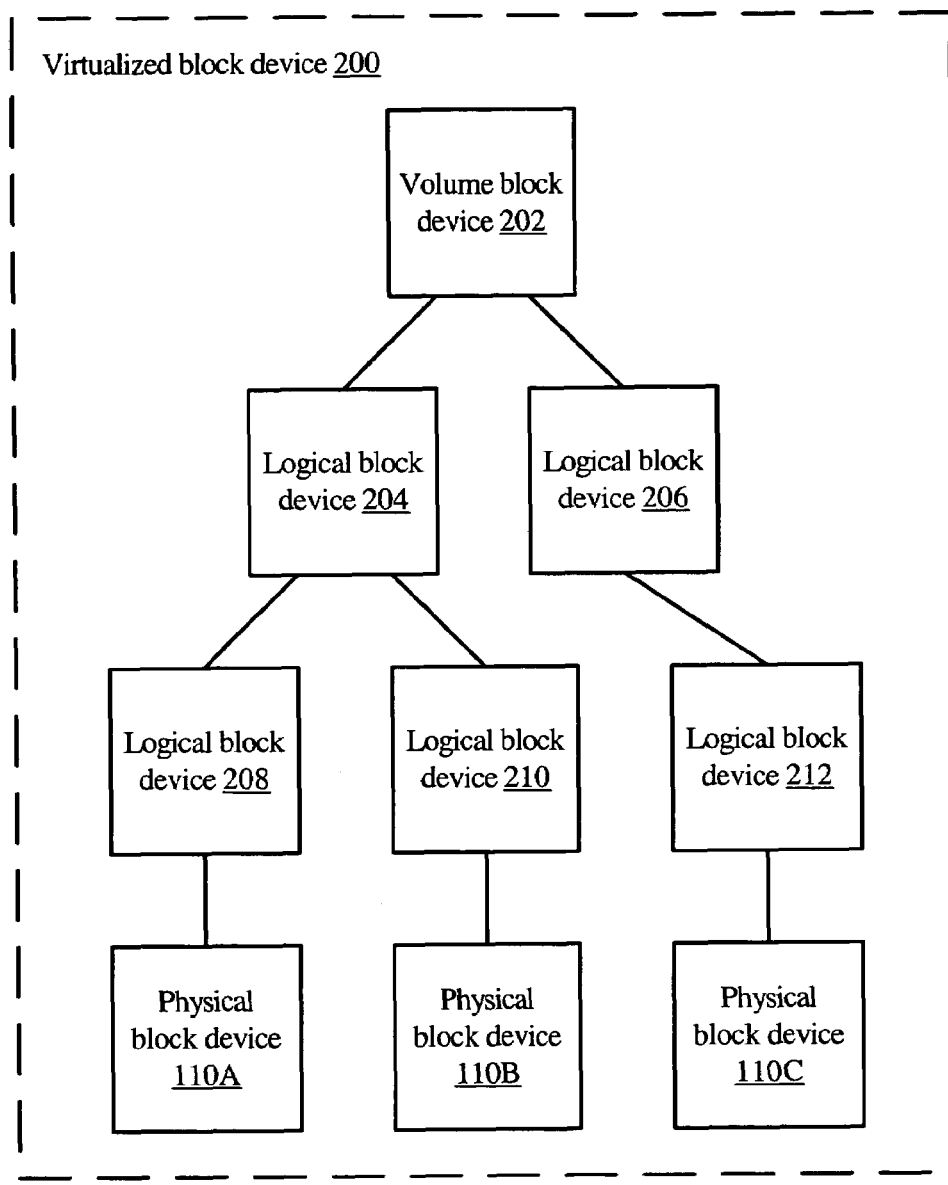
FIG. 2 is a block diagram illustrating one embodiment of a virtualized block device that may be presented as a volume.

The structure of the volume 150, for example as indicated by its corresponding storage object tree, may indicate to a given volume client 130 how the volume relates to one or more underlying physical storage devices. One embodiment of a virtualized block device that may be presented as a volume 150 to a volume client 130 is illustrated in FIG. 2. In the illustrated embodiment, virtualized block device 200 includes a volume block device 202 that includes logical block devices 204 and 206. In turn, logical block device 204 includes logical block devices 208 and 210, while logical block device 206 includes logical block device 212. Logical block devices 208, 210, and 212 map to physical block devices 110A-C of FIG. 1, respectively.

Virtualized block device 200 may in its entirety represent the structure of the data comprising a given volume 150, which data may be physically stored in physical block devices 110A-C. Volume block device 202 may be configured to be mounted within a file system or presented to an application or other volume consumer as the interface through which the consumer may interact with given volume 150. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 200 may be configured as a mirrored volume, in which a given data block written to virtualized storage device 200 is duplicated, and each of the multiple copies of the duplicated given data block are stored in respective block devices. In one such embodiment, volume block device 202 may be configured to receive an operation to write a data block from a consumer of corresponding volume 150. Volume block device 202 may duplicate the write operation and issue the write operation to both logical block devices 204 and 206, such that the block is written to both devices. In this context, logical block devices 204 and 206 may be referred to as mirror devices, mirrored plexes, or mirrors. In various embodiments, volume block device 202 may read a given data block stored in duplicate in logical block devices 204 and 206 by issuing a read operation to one mirror device or the other, for example by alternating devices or defaulting to a particular device. Alternatively, volume block device 202 may issue a read operation to multiple mirror devices and accept results from the fastest responder. Duplicating the data using a mirrored logical volume may thus result in improved I/O performance for reads, as well as in improved data availability. Configuration functionality provided by volume server 120 may allow new mirrors to be attached to an existing mirrored logical volume to further improve availability and read performance. In addition, it may be possible to detach or remove an existing mirror from a mirrored logical volume if required, making the existing mirror unavailable for access by any volume client. For example, if data corruption is detected at one existing mirror, the mirror may be detached for repair, leaving the remaining mirrors (if any) of the logical volume accessible for I/O operations.

In some configurations, several possible paths or routes may be available to access the mirrors of a mirrored logical volume. In one specific embodiment of system 100 including a mirrored volume, illustrated in FIG. 3, a volume client 130 may have direct physical connectivity to each mirrored device 310 of mirrored volume 300, for example using a fiber channel network. A write request to data residing within mirrored volume 300 may be duplicated into two specific write requests, as described above, using different routes, one to mirror 310A and one to mirror 310B. A write request to each mirror may result in a corresponding write response. In some embodiments, part of a connection to a mirror device 310 may be shared among several volume clients 130. In other embodiments, two or more mirrored devices 310 may share part of a connection to a volume client 130. In yet other embodiments, some volume clients 130 may have no direct connectivity to mirrored devices 310 at all, and may rely upon an intermediate volume client, volume server 120, or a set of other intermediaries to route their I/O requests to the mirrored devices 310. Numerous other variations of connectivity to mirrored devices are also possible. In one embodiment, for example, where a high level of availability may be desired, a volume client 130 may have multiple redundant connections to a given mirror device 310.

As described above and shown in FIG. 2, in some embodiments a virtualized block device 200 may employ multiple layers of virtualization. For example, in the embodiment described above where logical block devices 204 and 206 function as mirror devices, it may be the case that underlying physical block devices 110A-C have dissimilar performance characteristics; specifically, devices 110A-B may be slower than device 110c.

In order to balance the performance of the mirror devices, in one embodiment, logical block device 204 may be implemented as a striped device in which data is distributed between logical block devices 208 and 210. For example, even- and odd-numbered blocks of logical block device 204 may be mapped to logical block devices 208 and 210 respectively, each of which may be configured to map in turn to all or some portion of physical block devices 110A-B respectively. In such an embodiment, block read/write throughput may be increased over a non-striped configuration, as logical block device 204 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 110C may employ a different block size than logical block device 206. In such an embodiment, logical block device 212 may be configured to translate between the two physical block sizes and to map the logical block space define by logical block device 206 to the physical block space defined by physical block device 110C. In some instances, the logical block space of logical block device 212 need not be contiguously mapped to blocks of physical block device 110C; an arbitrary mapping may be used.

Numerous other possible configurations of block devices are contemplated that may incorporate more or fewer layers of virtualization to realize within a given instance of virtualized block device 200 virtualization functions similar to or different from those described above. For example, volume block device 202 may employ a greater number of mirror devices, striping may occur higher in the hierarchy than mirroring, certain logical block devices may be configured to perform snapshots of other devices, certain logical block devices may span multiple physical block devices, etc. Distribution of a virtualized block device as a volume to one or more clients may be referred to as distributed block virtualization.

A variety of configuration management functions may be provided by volume server 120 to volume clients 130. In the embodiment shown in FIG. 1, configuration management functions provided by volume server 120 include the management of I/O error handling policies for a volume 150. The term "I/O error handling policy", as used herein, refers to a set of rules describing the manner in which a specific volume client is allowed to respond when an I/O request made by the volume client to a specific volume fails. As described below in further detail, I/O requests may fail for many reasons, and a variety of rules may be used in responding to different classes of failures. In the embodiment shown in FIG. 1, the volume server 120 stores an entry representing an I/O error handling policy for a given specific volume 150 and a given specific volume client 130 in configuration database 140. Further details regarding configuration database entries are also provided below.

Failures of I/O operations may occur due to a variety of reasons. In a complex storage environment, for example, a failure may be caused by a loss of connectivity between storage devices and the data consumer, a hardware failure at a physical storage element such as a disk, or a software failure at some layer in the storage software stack, among other reasons. In response to an I/O error message generated by an I/O failure, an effort to determine the cause of the failure may be made, and corrective action may be taken to repair the storage environment if necessary. Depending on the nature of the error and the complexity of the environment, considerable effort may be required to respond to an I/O error appropriately. In some cases, for example, manual examination of log files or other records may be needed to determine the root cause of an error; in other cases, storage software may be configured to generate error messages that are sufficiently specific and detailed to identify a root cause. Even when a source of an I/O error has been determined, it may still require substantial resources to resolve, work around, or otherwise overcome the underlying problem. For example, if an I/O error is caused by a loss of connectivity due to a physical disablement of a network card, the card may need to be identified and replaced. If the only way to send an I/O request to (and receive a response from) a physical storage device in this example were through a connection that required the disabled network card, the storage device may not be accessible until the connection is repaired, even though the storage device by itself may be operable. If an I/O error is caused by a failure of a physical disk, a storage device that uses the physical disk may be unavailable until the physical disk is repaired or replaced.

Thus, depending on the cause of the I/O error, a storage device may have to be made unavailable to some data consumers while repair operations are performed. Applications may be prevented from performing I/O operations while the storage system is repaired. In a storage environment where different data consumers may have separate physical connections available to access a given physical storage device, however, not all kinds of errors may require applications to be blocked in this manner. If the I/O error is found to have been caused by a loss of connectivity between a volume client and a physical storage device, it may be possible to allow applications on the volume client to continue I/O operations using an alternate route, as described below.

Figure 4A:
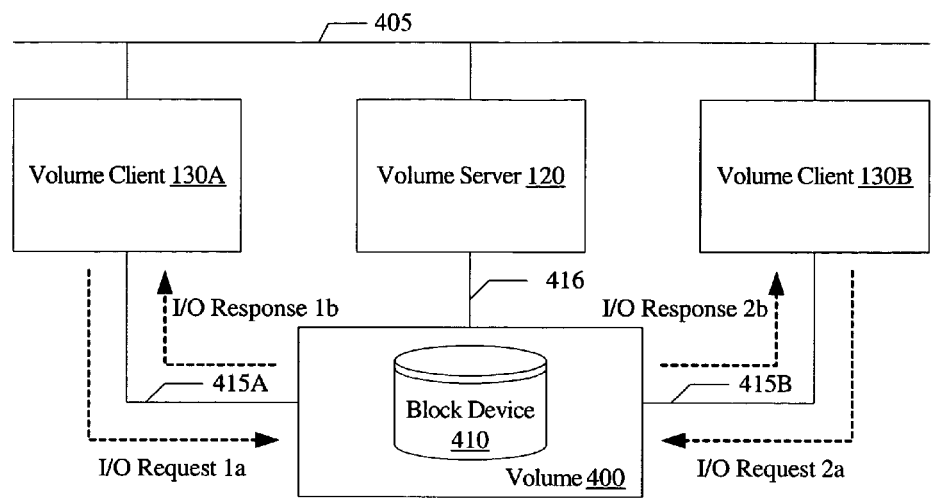
FIGS. 4a-4c are block diagrams collectively illustrating one embodiment of a block virtualization system where more than one route may be available to access storage within a volume.
Figure 4B:
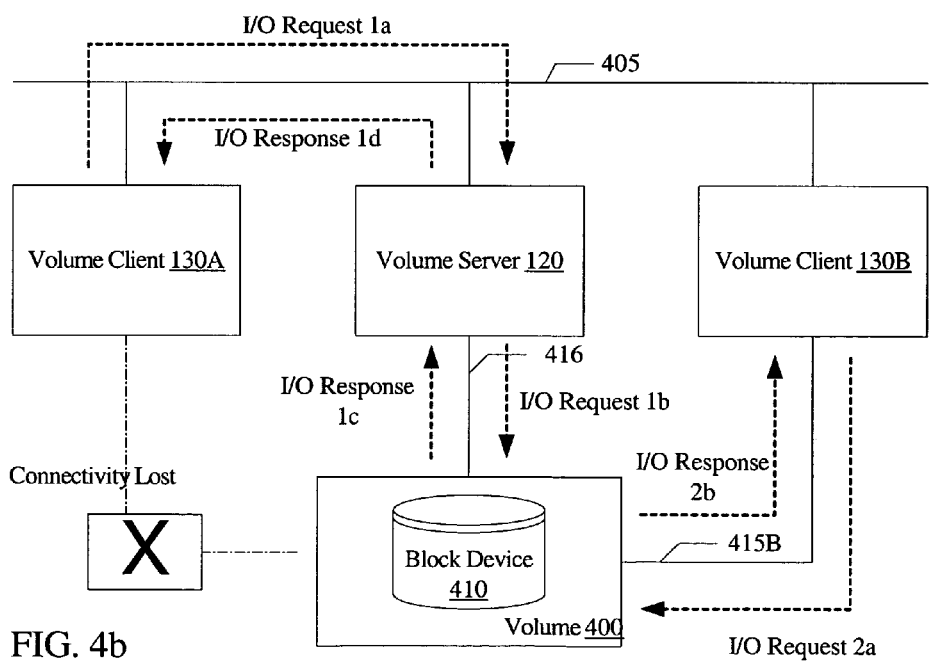
Figure 4C:
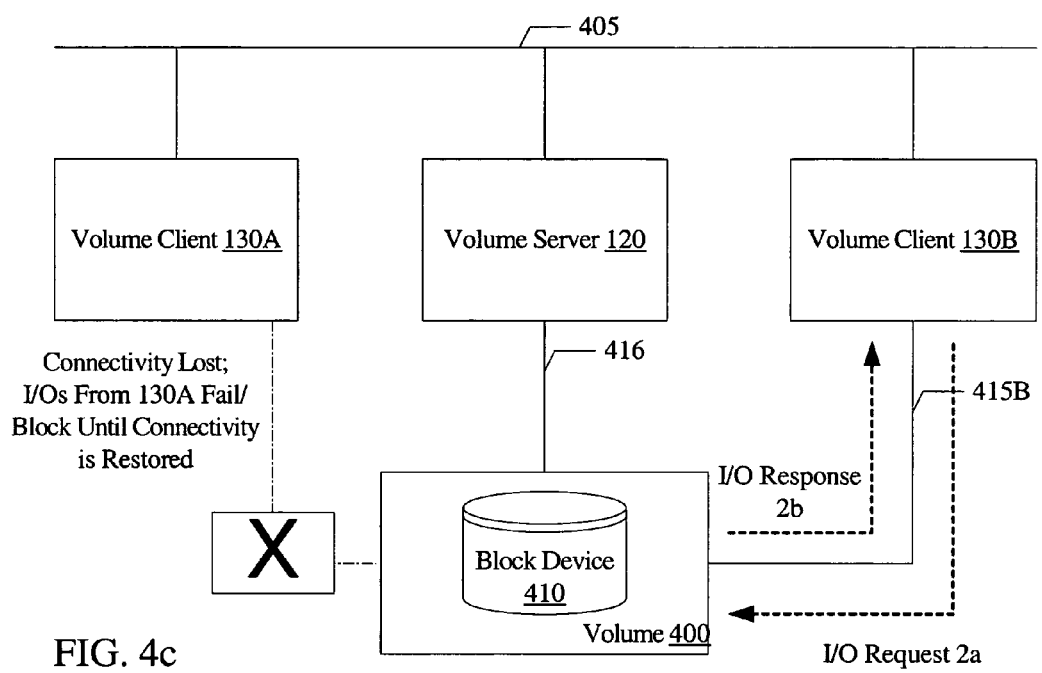

FIGS. 4a-4c collectively illustrate one embodiment of a block virtualization system that conforms generally to the system illustrated in FIG. 1, where more than one route may be available to access data stored in block device 410 within a volume 400. In FIG. 4a, volume clients 130A and 130B may use connections 415A and 415B, respectively, to access block device 410. Volume clients 130A and 130B are coupled to volume server 120 through a network 405. Volume server 120 is also shown with a connection 416 to block device 410.

As depicted in FIG. 4a, connections 415A, 415B, and 416 may be direct connections, in that an I/O request to block device 410 sent on any of these connections may not need to be processed by an intermediate volume server (or volume client) before it reaches the targeted physical storage. It may also be possible to route I/O requests from volume client 130A to block device 410 using other, indirect routes (for example, via volume server 120); however, the use of these indirect routes may result in lower levels of I/O performance, as described below. For volume client 130A, connection 415A may therefore be designated as a default route for sending I/O requests to, and receiving I/O responses from, block device 410; and similarly, for volume client 130B, connection 415B may be designated as a default route to perform I/O operations on block device 410. As used herein, a default route between a volume client 130 and block device 410 containing data of a volume 150 is a route used to send I/O requests to, and receive I/O requests from, block device 410 under normal operating conditions, i.e., in the absence of I/O errors.

In the embodiment shown in FIG. 4a, during normal operation, volume client 130A may issue an I/O request "1a" to block device 410 and get a response "1b", where both the request "1a" and the response "1b" use the default route of connection 415A. Volume client 130B may issue an I/O request "2a" using connection 415B to volume 400, and receive a response "2b" using connection 415B. In the configuration shown in FIG. 4a, an I/O request from volume client 130A for data in volume 400 may result in an I/O error if there is a loss of connectivity on the default route between volume client 130A and block device 410, for example if connection 415A becomes inoperable. Various factors may cause a loss of connectivity: for example, a physical fiber channel link forming part of connection 415A may be inadvertently damaged or disconnected from a fiber channel network. A loss of connectivity may also arise due to a software or firmware error associated with some element of connection 415A. In this circumstance, where a given volume client 130A loses connectivity on a default route to storage block device 410 within a volume 400, connection 416 between volume server 120 and block device 410 may remain operable, and the volume client 130A may be able to communicate with volume server 120 using network 405. Thus, as shown in FIG. 4b, it may be possible to respond to a loss of connectivity by rerouting I/O requests using an alternate route that uses network 405 and connection 416.

FIG. 4b shows an embodiment where a loss of connectivity has made connection 415A inoperable. Instead of using connection 415A to send an I/O request "1a" directly to block device 410, volume client 130A has been configured to route request "1a" indirectly to block device 410, via volume server 120 using network 405. Volume server 120 receives request "1a" from volume client 130A, and sends request "1b" to block device 410 using connection 416 on behalf of volume client 130A. Block device 410 sends a response "1c" to volume server 120 using connection 416, and volume server 120 in turn sends response "1d" to volume client 130A using network 405. Volume client 130B continues to use connection 415B to access block device 410, as in FIG. 4a. In some embodiments, when connectivity is restored on the default route, e.g., when connection 415A becomes operable again, volume client 130A may be configured to start using the default route again. Connectivity may be restored as a result of automatic error correction provided by storage management software or hardware, or it may require manual intervention to perform needed repairs As shown, volume client 130A may have more than one alternate route available to access block device 410 (for example, volume client 130A may be able to route I/O requests to block device 410 via volume client 130B instead of volume server 120). In such cases, one alternate route may be designated as the best among a set of available alternate routes based on some criteria. Various criteria may be used in different embodiments to choose the best available route. For example, in a storage environment where a given volume client 130A may not be aware of other volume clients that may have access to a given volume 400, a route via volume server 120 (as depicted in FIG. 4b) may be designated as the best available alternate route. In some embodiments, a best available alternate route may be determined after an exchange of messages between volume client 130A and volume server 120.

The use of an alternate route as described above, in response to a loss of connectivity on a default route, may be termed Best-Available routing. It is noted that Best-Available routing does not require the availability of multiple alternate routes between a volume client 130 and a block device 410; in a configuration where only a single alternate route is available, the single alternate route would be considered the best available route.

As described above, the use of Best-Available routing may allow an application running on volume client 130A to continue I/O operations despite a loss of connectivity on a default route to block device 410. For example, Best-Available routing may be appropriate for some applications, such as compute-intensive applications where substantial processing is required on each data block retrieved from a storage device, where it may be highly desirable to continue processing as long as some path to a needed storage device can be found. However, the use of an alternate route may have a cost: in particular, additional resources at network 405, volume server 120, and connection 416 may be used, resulting in an overall reduction in system performance. In addition, in a large storage environment with hundreds or thousands of volume clients, some or all of these resources may become overloaded in some circumstances, where, for example, connectivity losses occur in bursts. In complex environments, furthermore, not all volume clients may support applications of equal importance.

In order to prevent the problems described above, such as overloads, it may be advisable to configure some volume clients 130 to use Default-Only routing: that is, to refrain from using an alternate route even if it is available. Default-Only routing of I/O requests may be used, for example, in some failover configurations, where an important application may be configured to fail over from a first volume client to a second volume client in response to an error. Both the first and the second volume client may have a default route available to the storage devices that the application needs to access. Thus, in such a configuration, I/O requests from the application may be routed to storage using the default route of the first volume client under normal operation, and using the default route of the second volume client after failover in response to an I/O error. In contrast, Default-Only routing may also be used at some volume clients running applications of lower importance, where a delay to allow connectivity to be restored may be acceptable. For example, Default-Only routing may be sufficient to meet the needs of a report-generating application that summarizes transaction activity once every few hours. On encountering an I/O error, the report-generating application may be configured to abort its processing and restart after a specified period.

The use of Default-Only routing is illustrated for one embodiment in FIG. 4c. Once again, as in FIG. 4b, connectivity along the default route has been lost between volume client 130A and block device 410. Even though alternate routing using network 405 may be available, volume client 130A has been restricted to use only the default route of direct connection 415A to perform I/O operations on block device 410. As shown in FIG. 4c, I/O requests from applications running on volume client 130A may fail (or be blocked) until connectivity on the default route is restored. When connectivity again becomes available, volume client 130A may resume I/O operations using the default route of connection 415A.

In the embodiment shown in FIGS. 4a-4c, no intermediate server is shown between volume server 120 and block device 410; that is, connection 416 provides direct connectivity between volume server 120 and block device 410, just as connections 415A and 415B provide direct connectivity between volume clients and storage. In other embodiments, however, volume server 120 may be connected to block device 410 via other intermediate servers, via intermediate volume clients or via a combination of volume servers and clients. For example, in some embodiments, an I/O request routed from volume client 130A to volume server 120 may be redirected by volume server 120 to volume client 130B, and volume client 130B may perform the redirected I/O operation using connection 415B. In some embodiments, an alternate route from a volume client 130A to a block device 410 may not pass through a volume server 120 at all; rather, the request may be indirectly routed through other volume clients such as 130B. In other embodiments no direct connection between volume client 130A and block device 410 may exist; instead, there may be several indirect connections with varying numbers of intermediate servers. In such embodiments, a first connection (for example, the indirect connection with the fewest intermediate servers) may be designated as the default route for use during normal operation, and another indirect connection may be designated as a best-available alternate route when connectivity on the default route is lost.

It is noted that while the description of Best-Available and Default-Only routing above has been provided in the context of FIGS. 4a-4c, where volume 400 is shown as including a single block device 410, the use of Best-Available and Default-Only routing is not restricted to the limited configuration shown. In general, the routing techniques described may be used in any block virtualization system with alternate routes between a given volume client and a given block device, independent of the number of block devices contained within a given logical volume, or the number of levels of virtualization used within the logical volume.

As stated above, as part of configuration functionality provided to volume clients 130, volume server 120 may include an I/O error handling policy for handling errors from a given volume 150. One of the rules included in an I/O error handling policy in one embodiment may be a routing policy used to respond to errors caused by a loss of connectivity between a volume client 130 and a block device 410: for example, whether a given volume client should be restricted to using Default-Only routing or Best-Available routing, as described above. In other embodiments, other routing policies may also be available: for example, some routing policies may require a volume client to communicate with a number of other volume clients and/or volume servers when a connectivity loss on a default route is detected, and to distribute subsequent I/O requests among a number of routes based on the responses from the other volume clients and/or volume servers.

In addition to a routing policy for responding to connectivity errors, an I/O error handling policy may include other rules for dealing with other kinds of errors. In one embodiment, for example, where the storage environment includes a mirrored volume, a rule may be used for dealing specifically with a write error (i.e., an error encountered in response to a write request) to the mirrored volume, as described below.

As described earlier in conjunction with the description of FIG. 2, a virtualized block device in a distributed block virtualization storage environment may be configured as a mirrored volume, in which a given data block written to the virtualized block device is duplicated, and each of the multiple copies of the duplicated given data block are stored in respective block devices. Further, as described in conjunction with the description of FIG. 3, volume clients 130 may have different connections or routes available to access each mirror of a mirrored volume. In such an environment including a mirrored volume, it may be possible to respond to a write error to one of the mirrors using one of several options. As described below in further detail, the options may include a determination of whether a mirror may need to be detached from the volume, and if so, whether a decision to detach a mirror may be made at a volume server or at a volume client. These options may be included in an I/O error handling policy in the form of a mirror detach policy.

Figure 3:
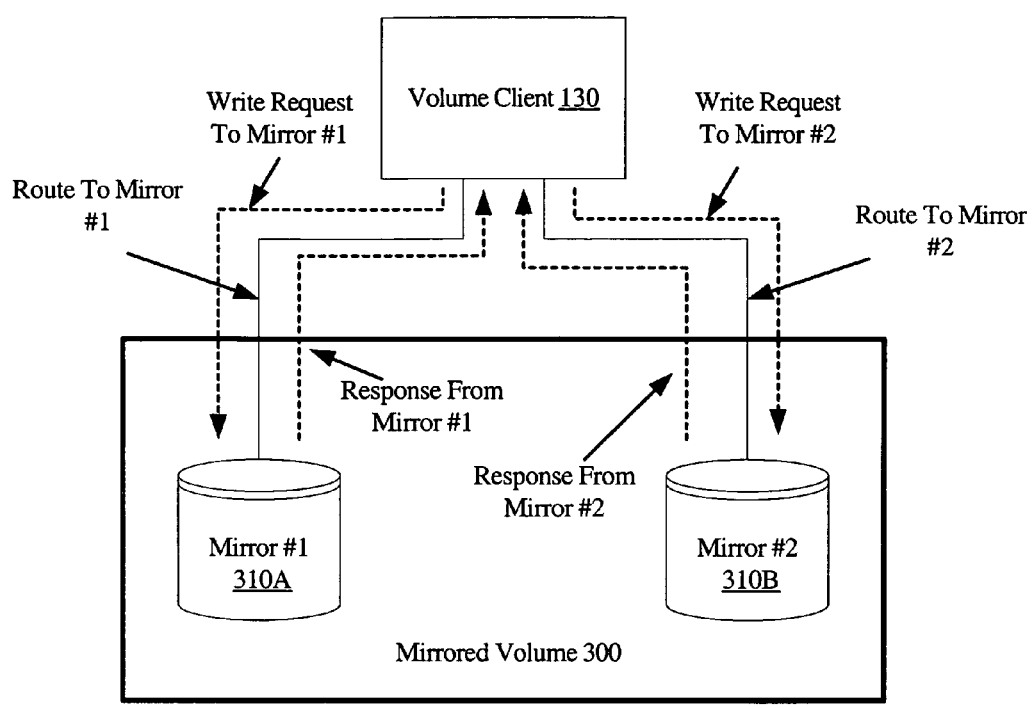
FIG. 3 is a block diagram illustrating one embodiment of a mirrored volume.
Figure 5A:
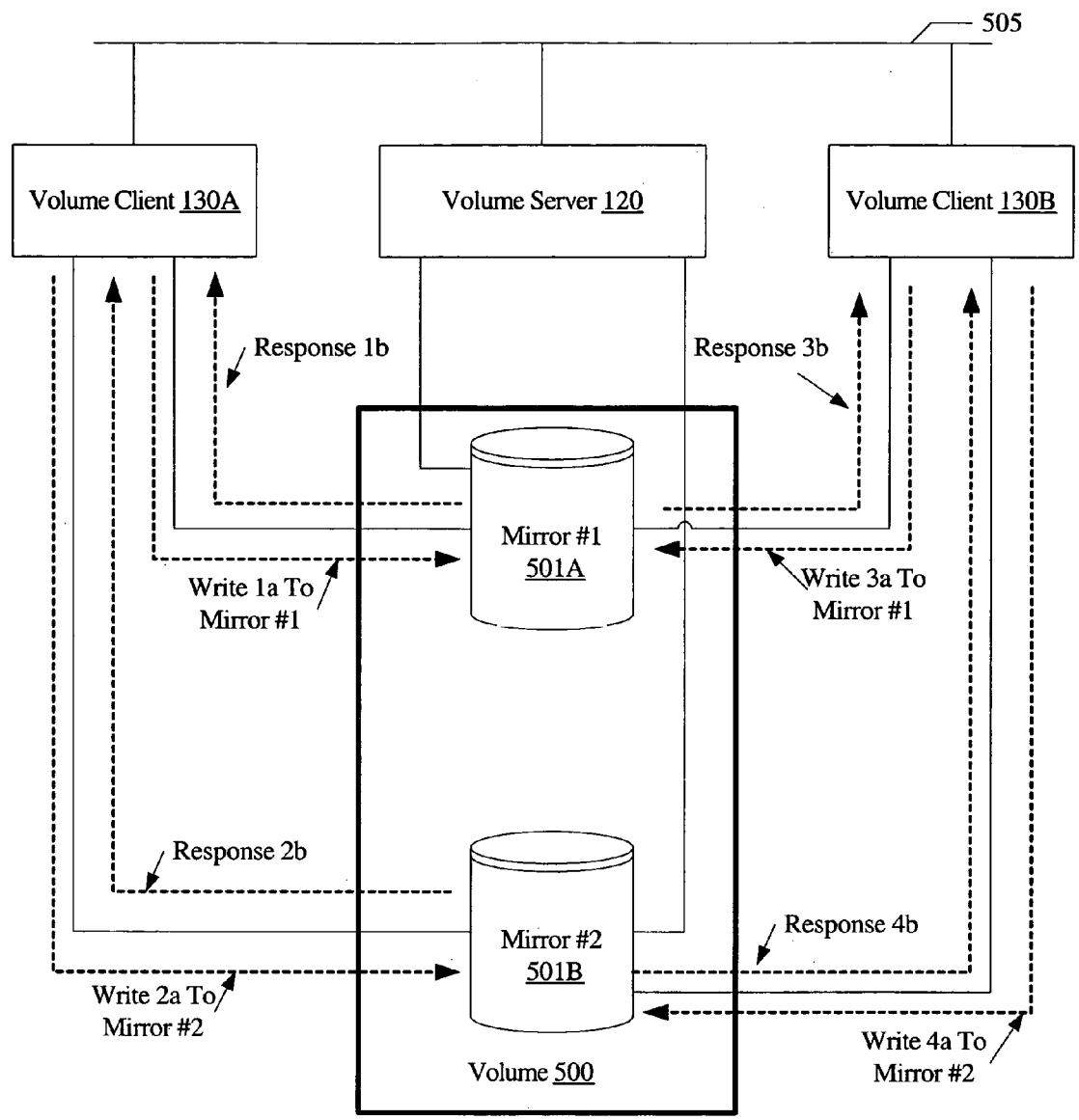
FIGS. 5a-5e collectively depict an example of the operation of a first mirror detach policy included as part of an I/O error handling policy according to one embodiment.

FIGS. 5a-5e collectively illustrate an example of the operation of one specific mirror detach policy included as part of an I/O error handling policy, according to one embodiment of a system that implements the functionality described in conjunction with FIG. 3. In FIG. 5a, two volume clients 130A and 130B are shown coupled to volume server 120 via a network 505, and to a mirrored volume 500, including mirrors 501A and 501B. As shown, mirrors 501A and 501B each consist of a single block device. Mirrors 501A and 501B are each accessible from each of the volume clients 130A and 130B using a direct connection: that is, each volume client has two connections to the mirrored volume, one for each mirror. During normal operation, a request from volume client 130A to write a block of data stored in mirrored volume 500 is converted into two independent write requests, 1a and 2a, directed at mirrors 501A and 501B respectively. Request 1a results in a response 1b; request 2a results in a response 2b, as shown. Similarly, a write request from volume client 130B may be converted into two separate write requests 3a and 4a, one for each mirror, and corresponding responses 3b and 4b may be generated during normal operation.

Figure 5B:
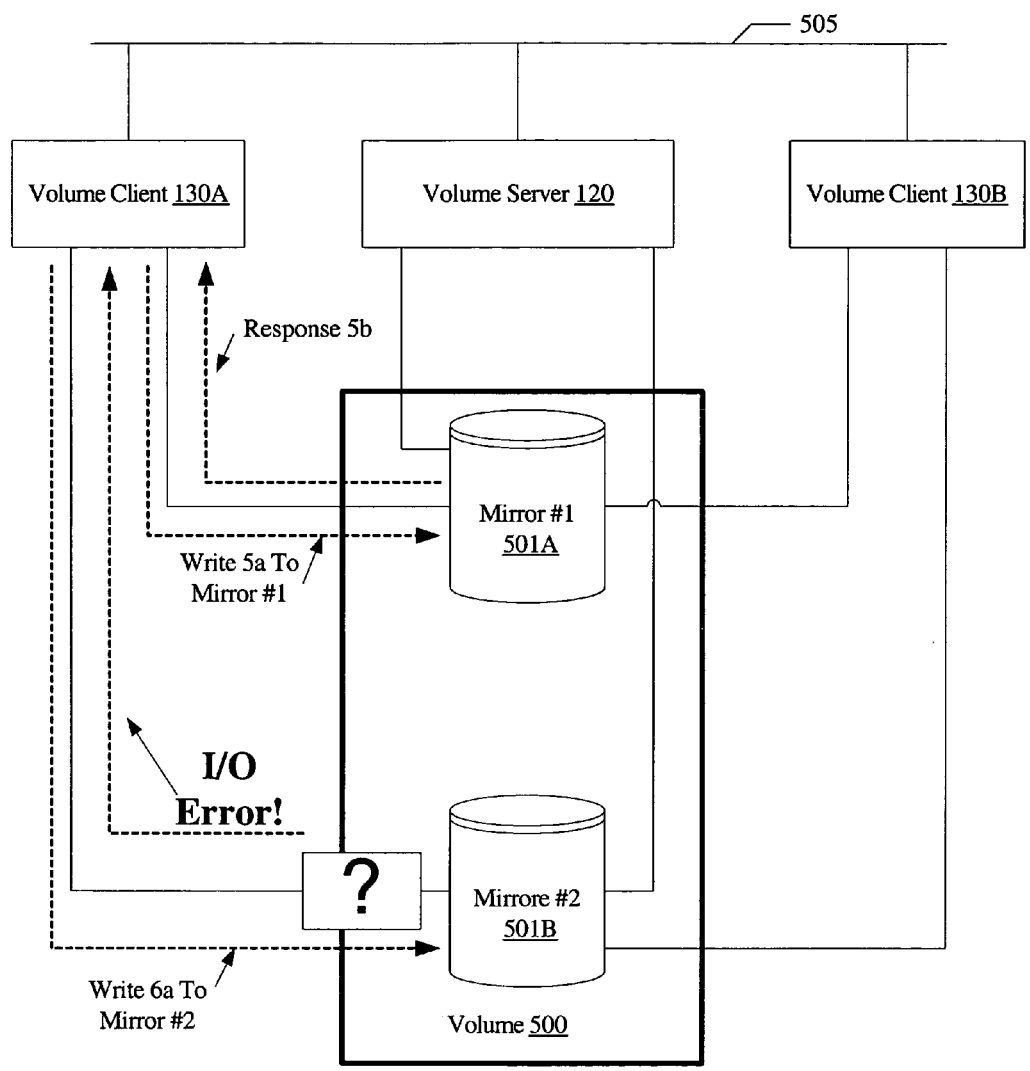

In FIG. 5b, a pair of write requests, 5a and 6a, are sent to mirrors 501A and 501B respectively from volume client 130A. Request 5a succeeds, generating response 5b. However, in response to request 6a targeted at mirror 501B, volume client 130A gets an I/O error. On receiving such an error, a decision may need to be made whether to detach the mirror 501B where the error occurred from the logical volume 500. One consequence of detaching such an "error" mirror (so designated to distinguish it from remaining mirrors such as 501A which may remain operational) is that once the error mirror is detached, I/O to the error mirror may be prevented from all data consumers on all volume clients until the error mirror is repaired, re-attached and resynchronized with the other mirrors of volume 500. If the write error is caused by a corruption at a physical disk making up mirror 501B, a detach operation as quickly as possible after the occurrence of the write error may be desired. If, however, a loss of connectivity between volume client 130A and mirror 501B causes the write error, a detach operation may prevent other volume clients from successfully accessing the mirror. In some embodiments, however, volume client 130A may not be configured to initiate detach operations. In addition, in some embodiments volume client 130A may be unable to determine whether the write error was caused by a loss of connectivity.

Figure 5C:
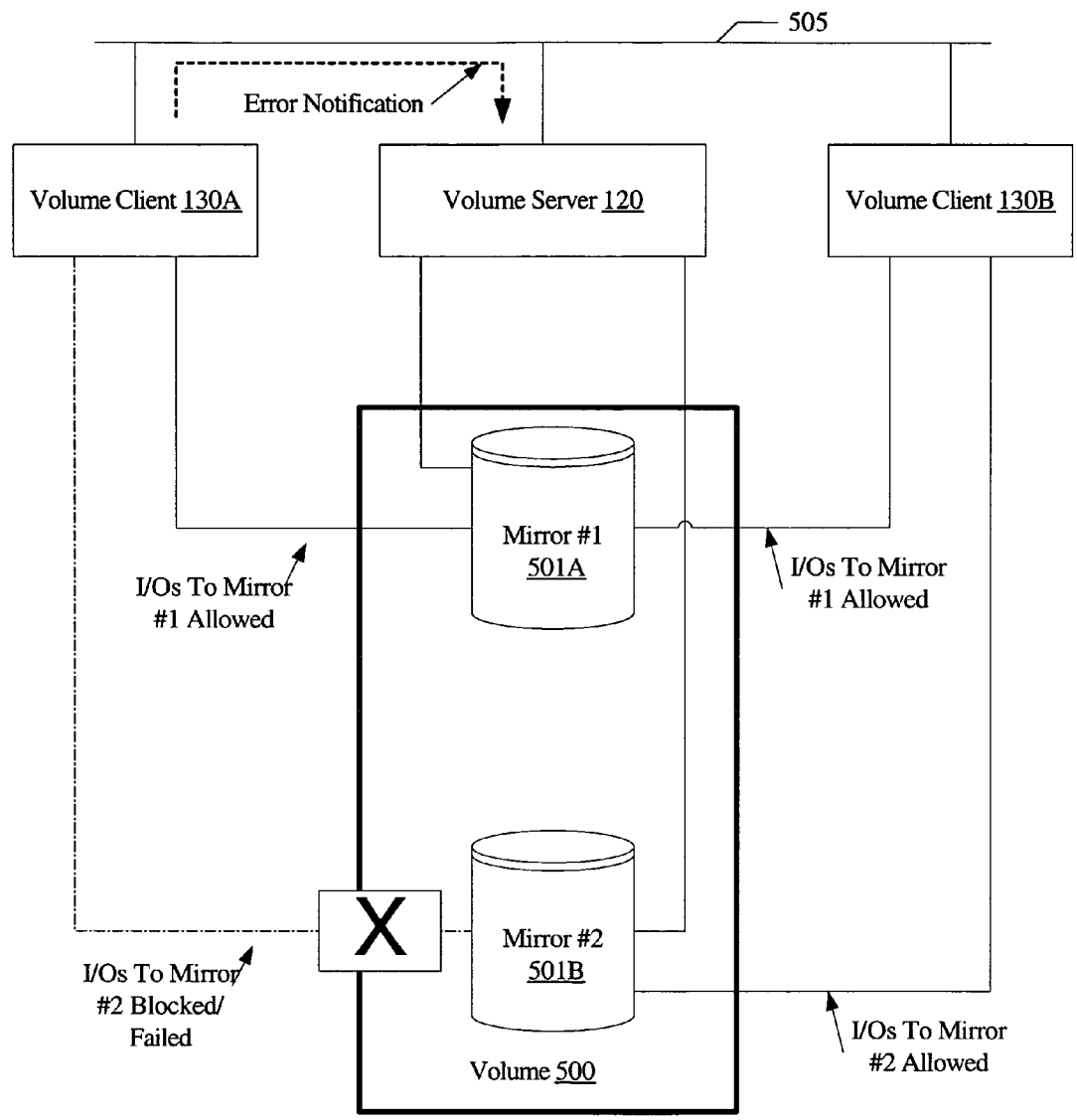

As shown in FIG. 5c for one embodiment, on receiving a write error from a mirror, volume client 130A may block any further I/O requests to mirror 501B and send an error notification to volume server 120. The error notification may, in one embodiment, include details of write request 6a (for example, the targeted storage address and data set size of the write request) and a description of the specific error message received by volume client 130A in response to write request 6a. I/O requests to mirror 501A may continue to be processed, as shown, from volume clients 130A and 130B; and I/O requests from volume client 130B to mirror 501B may also continue to be processed.

Figure 5D:
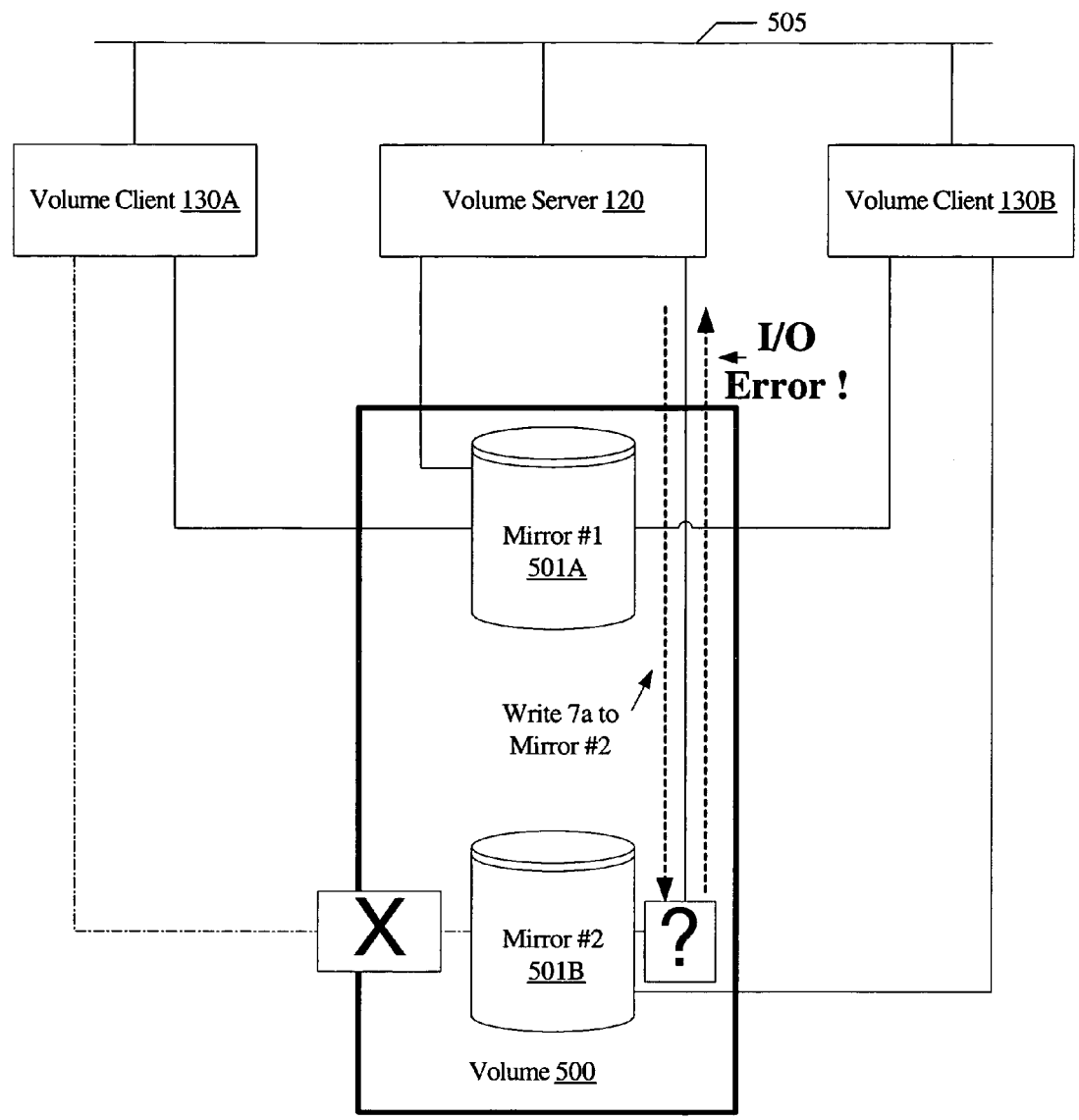
Figure 5E:
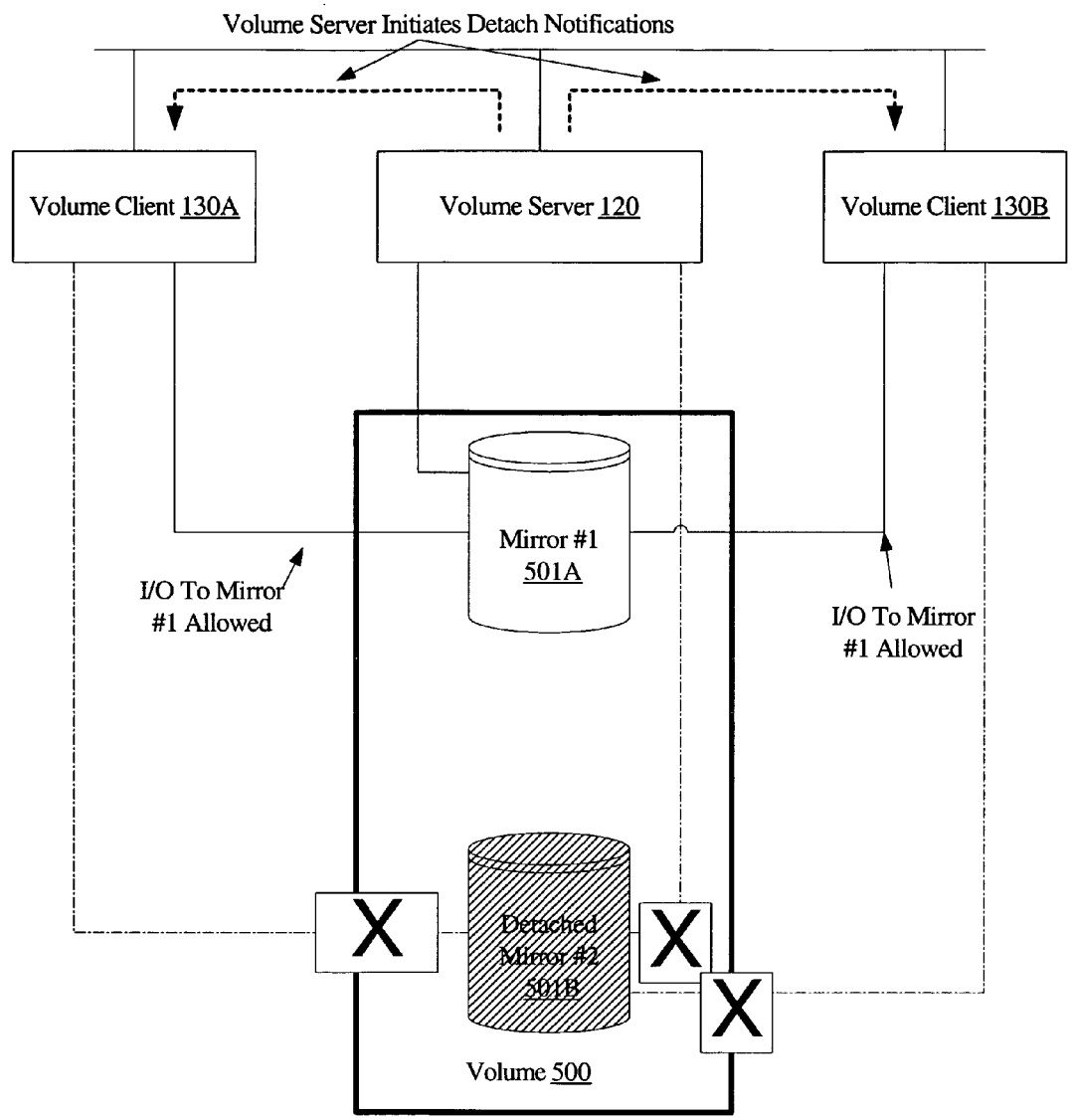

On receiving the error notification from volume client 130A, volume server 120 may perform a write verification test on mirror 501B to determine whether it is possible to complete a write operation successfully on mirror 501B using a route other than the one used by volume client 130A. For example, volume server 120 may send a write request 7a to mirror 501B, as shown in FIG. 5d. If request 7a results in an I/O error, as shown, volume server 120 may determine that mirror 501B needs to be detached. Volume server 120 may then send a detach notification to volume clients 130A and 130B, as shown in FIG. 5e for this embodiment. I/Os from both volume clients as well as the volume server may be blocked until error mirror 501B is repaired, re-attached and resynchronized. I/O to mirror 501A may continue, as shown in FIG. 5e. If write request 7a succeeds, volume server 120 may determine that the probable cause of the write error received by volume client 130A in FIG. 5b was a loss of connectivity restricted to volume client 130A, and that a detach of mirror 501B may not be required, since other routes to mirror 501B remain operational.

Write verification tests may be performed by volume server 120 using routes other than the one illustrated in FIG. 5d. For example, in one embodiment, volume server 120 may use an indirect route, for example via volume client 130B, to determine whether write operations to mirror 501B are possible.

In the operations illustrated in FIGS. 5a-5e, as described, a decision as to whether a detach operation is required is made at volume server 120 rather than at a volume client 130. This represents a use of a Volume-Server-Initiated mirror detach policy that may be included in an I/O error handling policy for a given volume client 130A and a volume 500. Such a Volume-Server-Initiated detach policy may be employed, for example, if several applications of similar importance frequently access mirrored volume 500, and it may be desired to verify that write requests from two independent sources result in I/O errors before a detach operation on a mirror may be initiated. A Volume-Server-Initiated detach policy may also be employed in a storage environment where it may be desired that the ability to initiate major configuration changes, such as detach operations, be limited to volume servers.

Figure 6A:
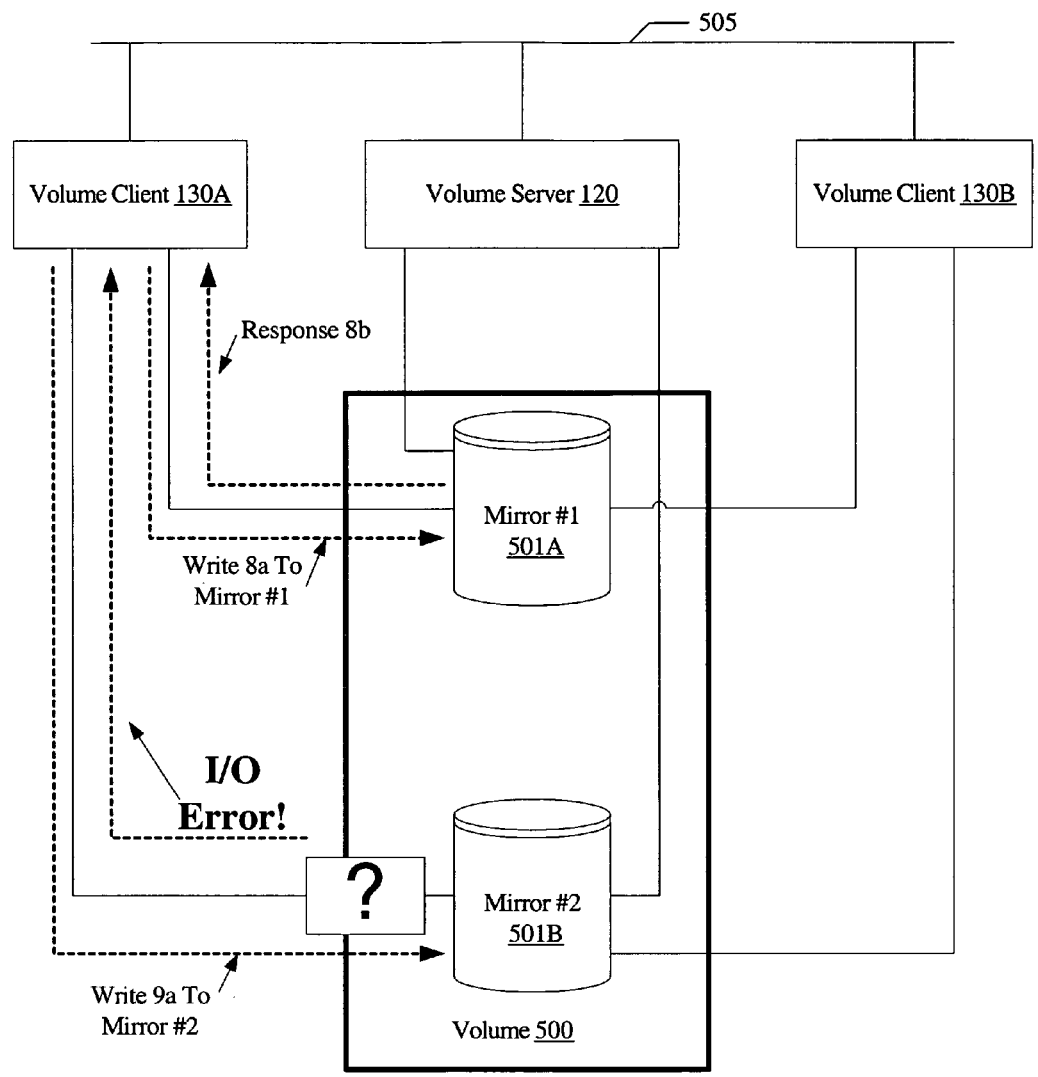
FIGS. 6a-6b collectively show the operation of a second mirror detach policy included as part of an I/O error handling policy according to another embodiment.
Figure 6B:
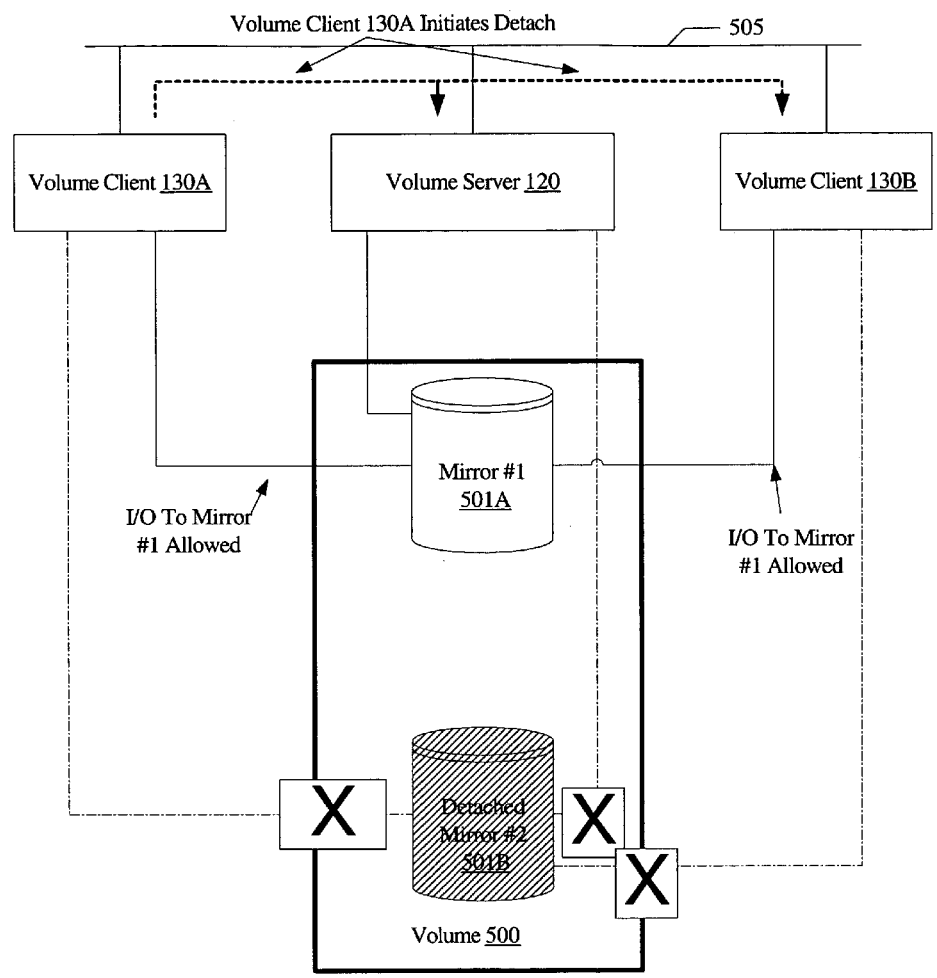

In contrast, FIGS. 6a-b together illustrate an embodiment where a second, Volume-Client-Initiated mirror detach policy is used in response to a write error to a mirrored volume. As shown in FIG. 6a, volume client 130A may send a write request 8a to mirror 501A and a corresponding write request 9a to mirror 501B. Request 8a may succeed and result in response 8b; request 9a may result in an I/O error. In response to the I/O error, as shown in FIG. 6b, volume client 130A may initiate a detach operation by sending a detach notification to volume server 120 and volume client 130B in one embodiment. It may be desirable to employ such a Volume-Client-Initiated detach policy for a specific volume client 130A and specific mirrored volume 500 if, for example, it is expected that I/O requests are sent to volume client 500 from other volume clients only infrequently.

It is noted that while FIGS. 5a-e and FIGS. 6a-b depict a configuration where volume clients 130 and volume server 120 may access mirrors 501 using direct connections, Volume-Server-Initiated and Volume-Client-Initiated detach policies may also be used in other configurations using a mirrored logical volume, where, for example, some volume clients and/or volume servers may not have direct connectivity to the mirrors of the logical volume. It is also noted that while a Volume-Server-Initiated detach policy differs from a Volume-Client-Initiated detach policy in that the decision as to whether a detach operation is performed is made at the volume server rather than an a volume client, once the decision has been made, the detach operation itself may be implemented in the same manner regardless of the detach policy being used. For example, in one embodiment, a detach operation may be implemented using a detach protocol managed by a volume server, where a sequence of messages is exchanged between the volume server and volume clients to ensure that I/O operations have been quiesced, and various other steps taken to protect data integrity, before the error mirror is taken offline.

In addition to the Volume-Server-Initiated and Volume-Client-Initiated detach policies described above, other detach policies may also be included in I/O error handling policies in various embodiments. For example, a Majority-Vote detach policy may be used in one embodiment, where upon the occurrence of a write error on a mirror, the set of volume clients using the mirrored volume may be polled by a volume server to determine whether a majority of the volume clients may successfully write to the mirror in question. If, in such an embodiment, it is not possible for a majority of the volume clients to write successfully to the mirror, a decision to detach the mirror may be made.

In some embodiments, detach operations may also be initiated, and detach policies as described above employed, in response to read failures rather than write failures. For example, if a Volume-Server-Initiated detach policy were employed in such an embodiment, volume client 130A may send a notification of a read error from mirror 501B to volume server 120, and volume server 120 may perform a read verification test on mirror 501B. If the read verification test fails, volume server 120 may initiate a detach operation mirror 501B may be detached in such an embodiment.

It is noted that while FIGS. 5a-5e and 6a-6b depict embodiments where a mirrored volume consists of two mirrors, and each mirror consists of a single block device, the detach policies described above may be applied to more complex mirrored volume configurations. For example, in some embodiments, multiple mirrors may be employed, each mirror may include more than one block device, and multiple layers of virtualization may be employed within the mirrored volume.

In addition to a routing policy and a detach policy, an I/O error handling policy for a given volume client 130 and a volume 150 may also include other rules. For example, in some embodiments an I/O error handling policy may include a reporting policy that may control the format of error messages and the destinations to which error messages may be directed. In such an embodiment, it may be desired that an I/O error received by a specific important volume client 130A from a particular volume 150 may cause an e-mail message and/or an automated telephone message to be generated in addition to an entry for the I/O error being saved in a log file; while for another, less important volume client 130B, the saving of an entry in a log file may be a sufficient level of reporting. In another embodiment, an I/O error handling policy may include a validity period. In such an embodiment, upon the expiration of the validity period, the I/O error handling policy may revert to a default set of constituent policies, or may need to be reconfigured.

As stated earlier, volume server 120 stores an entry representing an I/O error handling policy for a given specific volume 150 and a given specific volume client 130 in configuration database 140. An example of a configuration database entry for an I/O error handling policy is shown in FIG. 7 for one embodiment. The entry contains a volume client identifier ("VC1"), a volume identifier ("V1"), and representations of the elements making up the I/O error handling policy. In the illustrated example, the I/O error handling policy has two elements: a routing policy (Default-Only) and a detach policy (Volume-Client-Initiated). In other embodiments, the database entry may include other elements such as a reporting policy or a validity period as described above. It is noted that FIG. 7 shows the logical structure of a configuration database entry, and that the entry may be physically implemented using a variety of techniques. For example, the information contained in the entry may be stored in data structures at some level of storage software in system 100, in an operating system, or it may be managed in a separate database. In some embodiments, configuration database 140 may be stored in persistent storage, which may be attached to volume server 120 directly or may be attached to a configuration server distinct from volume server 120. Elements of the entry may be physically maintained separately: for example, there may be one data structure for routing policies and another data structure for detach policies.

In some embodiments of system 100, volume server 120 may be configured to distribute all virtualized block devices as volumes 150 to each volume client 130 within the system. Each volume client may be provided connectivity to all physical storage devices, such as devices 110. Identical I/O error handling policies may be used for a given volume 150 for each volume client 130. Such embodiments may be referred to as symmetric distributed block virtualization systems. However, as described earlier, not all volume clients 130 may require identical I/O error handling policies for a given volume 150.

In a complex environment, several volume clients, each running a different application, may require access to a given volume. The frequency and types of I/O operations required may differ from application to application. The relative importance of applications accessing a given volume, where the applications run on different volume clients, may also differ as described above. In response to these conditions and for other reasons, it may be desirable to use different I/O error handling policies to respond to error messages received by different volume clients 130 from a given volume 150. The different I/O error handling policies may differ from one another in the routing policies employed, detach policies, reporting policies, or any other constituent element or combination of elements.

In one embodiment, for example, where two volume clients 130A and 130B access a given volume 150, an I/O error handling policy for volume client 130A may include a first routing policy, and an I/O error handling policy for volume client 130B may include a second routing policy that differs from the first routing policy. In another embodiment, the detach policy included in an I/O error handling policy for volume client 130A for volume 150A may differ from the detach policy included in an I/O error handling policy for volume client 130B for volume 150A, while the routing policies included in the two I/O error handling policies may be identical. In yet another embodiment, an I/O error handling policy for volume client 130A for volume 150A may differ in both routing policy and detach policy from an I/O error handling policy for volume client 130B for volume 150A. Furthermore, in an embodiment where a given volume client 130N accesses more than one volume, an I/O error handling policy for volume client 130N to access a volume 150N may differ in routing policy, detach policy, or other constituents from an error handling policy for volume client 130N to access another volume 150P.

In FIG. 8, seven I/O error handling policy entries are shown in an example of configuration database 140 illustrating the use of different I/O error handling policies for various combinations of volumes 150 and volume clients 130 in one embodiment. The I/O error handling policy for volume client VC1 to access volume V1 in the example shown includes a Default-Only routing policy and a Volume-Client-Initiated detach policy. The error handling policy for volume client VC2 to access volume V1 includes a Best-Available routing policy and a Volume-Client-Initiated detach policy. I/O error handling policy entries are also shown for four other combinations of volume clients and volumes.

Encodings of I/O error handling policies such as those shown in FIG. 8 may be cached at volume clients 130 in one embodiment. Caching I/O error handling policies at volume clients may help reduce the workload of a volume server 120 and network 405. If a lookup of an I/O error handling policy at volume server 120 were required in response to each I/O error message received at a volume client 130, network traffic and processing may result that could be avoided by caching I/O error handling policies at the volume clients. FIG. 9 is a block diagram illustrating a cache 910 maintained by a volume client 130 containing encodings of I/O error handling policies EHP901, EHP902 and EHP903 for volumes V901, V902, and V903 accessed by volume client 130. Cache 910 may be maintained using any suitable data structure, for example in a hash table keyed by volume identifier, a tree, etc. Cache 910 may be maintained in any specific volatile storage, or in any specific persistent storage at the volume client.

As described above, for a variety of reasons it may be desirable to use different I/O error handling policies for different volume clients accessing the same volume 150. The use of different I/O error handling policies for two volume clients 130 accessing a given volume 150 thus represents one kind of asymmetry in a distributed block virtualization environment. Generally speaking, several kinds of asymmetry are possible in implementing distributed block virtualization. For example, in one embodiment, different volume clients such as 130A and 130C may have access to different logical volumes 150A and 150B. In such an embodiment, an I/O error handling policy for volume client 130A and volume 150A may differ in routing policy, detach policy, or other constituents from an I/O error handling policy for volume client 130C and volume 150B. Thus there may be an asymmetry not only in the set of volumes that two volume clients may access, but also in the manner in which volume clients may respond to I/O errors received from volumes that they may access. It is noted that distributed block virtualization systems also may be considered asymmetric in terms of how the virtualization is controlled. That is, in a system that is asymmetric in the control sense, the management of block virtualization that is performed by volume server 120 may be distinctly separated from input/output (I/O) activity to the virtualized block devices, such as performed by volume clients 130. For example, volume server 120 may be a completely separate system from volume clients 130 as illustrated in FIG. 1. By contrast, in a system that is symmetric in the control sense, one of the client systems configured to perform I/O to a virtualized block device may also be configured to manage block virtualization on behalf of the other client systems.

Figure 10:
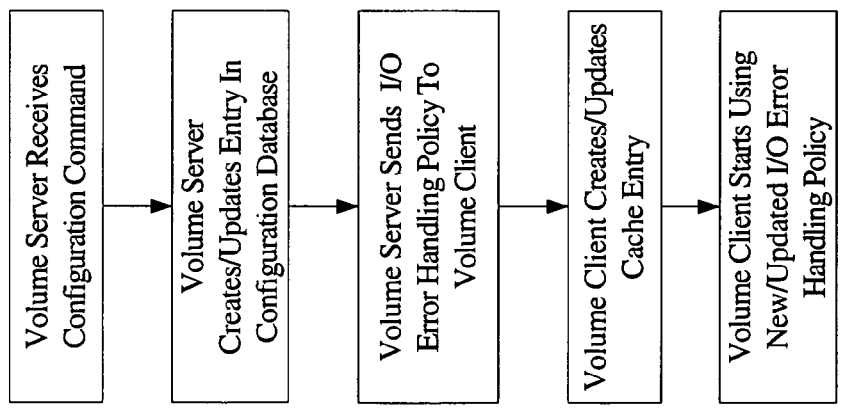
FIG. 10 illustrates a sequence of operations performed at a volume server and a volume client in response to a command to create or modify an I/O error handling policy in one embodiment.

A variety of techniques may be used to create and manage I/O error handling policies in computer system 100. FIG. 10 illustrates a sequence of operations performed at a volume server 120 and a volume client 130 to create or update an error handling policy for a given volume client 130 and volume 150 in one embodiment. Updates to an I/O error handling policy may be made without taking volume 150 offline in the illustrated embodiment. As shown in FIG. 10, an I/O error handling policy may be created or updated in response to a configuration command issued to volume server 120. Volume server 120 may create or update an entry in configuration database 140, as mentioned above, for the I/O error handling policy. Once the I/O error handling policy has been created or updated, volume server 130 may send the I/O error handling policy to volume client 130 using a variety of interfaces (for example in response to a mount request issued by volume client 130), and volume client 130 may cache the I/O error handling policy as described above. Volume client 130 may then use the cached I/O error handling policy to respond to any I/O errors received in response to I/O requests directed at volume 150.

It is noted that in some embodiments, upon an initial detection of an I/O error, low-level storage management software may retry an I/O request several times before sending an I/O error message to an application or other data consumer; that is, the I/O error handling policies described above may be invoked only after several low-level I/O operation attempts fail. It is also noted that in order to apply some of the rules included in I/O error handling policies as described above, a determination of the probable cause of the error (for example, that an error is caused by a loss of connectivity rather than a corrupted physical disk block) must be made before a specific rule (for example, a routing policy) may be applied. As stated earlier, the determination of a cause of an I/O error may be made in several ways, some automated and some requiring manual intervention. In some embodiments, for example, the determination may involve one or more messages being exchanged between volume clients 130 and volume server 120.

It is also noted that the I/O error handling policies described above, such as Best-Available routing, may be used in symmetrically distributed block virtualization environments, rather than in asymmetrically distributed environments. For example, each volume client 130 may be configured to switch to using an alternate path to a given block storage device 110 if a default path to block storage device 110 becomes unavailable.

In general, volume clients 130 may be any type of device capable of interacting with a given volume 150 for data storage and retrieval. For example, in one embodiment a volume client 130 may be a server computer system, including one or more processors and one or more system memories, where the server system is configured to execute software such as one or more operating systems and/or applications. In another embodiment, a volume client 130 may be a client computer system configured to access a given volume 150 via a separate server computer system. In other embodiments, a volume client 130 may be an embedded system configured to use application specific integrated circuit (ASIC) or field-programmable gate array (FPGA) technology to execute operations whereby a given volume 150 may be accessed. Numerous other configurations of volume clients 130 are possible and contemplated. Additionally, in some embodiments it is contemplated that the function of volume server 120 may be implemented via one or more of volume clients 130, whereas in other embodiments volume server 120 may be implemented via hardware distinct from volume clients 130. Network 160 may be implemented using a variety of hardware and software, including, for example, Ethernet and TCP/IP to connect volume clients 130 to volume server 120, and fiber channel to connect volume clients and volume servers to block devices 110.

Figure 11:
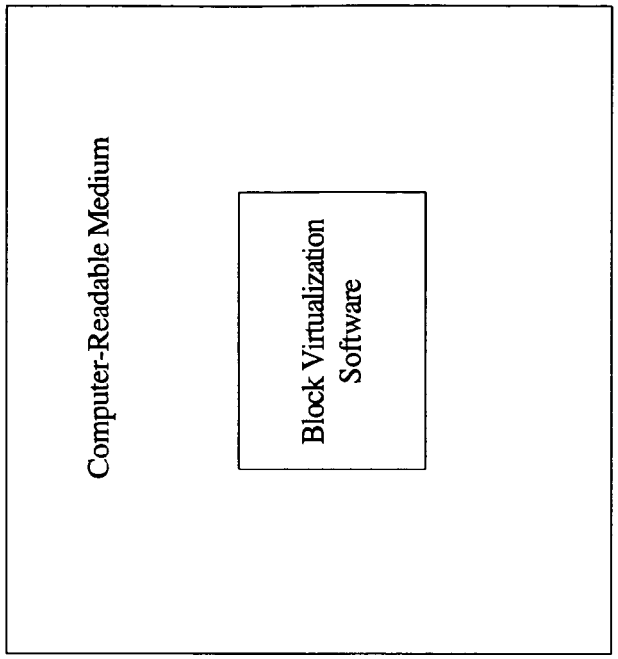
FIG. 11 shows one embodiment of a computer-accessible medium comprising block virtualization software instructions.

FIG. 11 shows one embodiment of a computer-accessible medium comprising block virtualization software instructions, which, when executed, accomplish the functionality of volume server 120 and volume client 130 described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a volume server;
   a plurality of volume clients; and
   one or more physical block devices;
   wherein the volume server is configured to:
      aggregate storage in the one or more physical block devices into a logical volume; and
      make the logical volume available to a given one of the volume clients;
   and wherein, in response to a detection of a loss of connectivity on a designated route between the given volume client and a physical block device of the one or more physical block devices, the given volume client is configured to send an I/O request to the physical block device using an alternate route dependent upon a given I/O error handling policy corresponding to the given volume client, wherein the given I/O error handling policy differs from an I/O error handling policy employed by another one of the plurality of volume clients.

2. The system as recited in claim 1, wherein, in response to a restoration of connectivity on the designated route between the volume client and the physical block device, the volume client is further configured to send a subsequent I/O request to the physical block device using the designated route.

3. The system as recited in claim 1, wherein in sending the I/O request to the physical block device using the alternate route, the volume client sends the I/O request to the volume server, and the volume server sends the I/O request to the physical block device.

4. A system comprising:
a volume server;
a volume client; and
a plurality of physical block devices;
wherein the volume server is configured to:
   aggregate storage in the plurality of physical block devices into a mirrored logical volume, wherein the mirrored logical volume includes a plurality of mirrors; and
   make the mirrored logical volume available to the volume client;
and wherein,
   in response to a failure of a write operation on a mirror of the plurality of mirrors, the volume client is configured to send a notification to the volume server, and
   in response to the notification, the volume server is further configured to perform a write verification test on the mirror, and to initiate a detach operation on the mirror if the write verification test fails.

5. A system comprising:
a volume server;
a first and a second volume client; and
one or more physical block devices;
wherein the volume server is configured to:
   aggregate storage in the one or more physical block devices into a logical volume;
   make the logical volume available to the first volume client using a first I/O error handling policy;
   make the logical volume available to the second volume client using a second I/O error handling policy;
wherein the first I/O error handling policy differs from the second I/O error handling policy.

6. The system as recited in claim 5, wherein each of the first and second I/O error handling policies includes a routing policy.

7. The system as recited in claim 5, wherein each of the first and second I/O error handling policies includes a detach policy.

8. The system as recited in claim 7, wherein each of the first and second I/O error handling policies includes a routing policy.

9. The system as recited in claim 5, wherein the volume server is further configured to change the first and second I/O error handling policies without taking the logical volume offline.

10. The system as recited in claim 5, wherein each of the first and second volume clients may have a validity period.

11. The system as recited in claim 5, wherein the volume server is further configured to maintain an entry in a configuration database for each of the first and second volume clients, wherein the entry associates a particular I/O error handling policy with a given logical volume.

12. The system as recited in claim 11, wherein the configuration database is stored in non-volatile storage.

13. The system as recited in claim 11, wherein the first volume client is configured to maintain an encoding of the first I/O error handling policy in a cache.

14. The system as recited in claim 13, wherein in response to a configuration command, the volume server is further configured to:
update an entry in the configuration database; and
send an updated I/O error handling policy to the first volume client;
and wherein, in response to a reception of an updated I/O error handling policy, the first volume client is further configured to update the encoding of the first I/O error handling policy in the cache.

15. A system comprising:
a volume server;
a volume client; and
one or more physical block devices;
wherein the volume server is configured to:
   aggregate storage in the one or more physical block devices into a first logical volume and a second logical volume;
   make the first logical volume available to the volume client using a first I/O error handling policy;
   make the second logical volume available to the volume client using a second I/O error handling policy;
wherein the first I/O error handling policy differs from the second I/O error handling policy.

16. A system comprising:
a volume server;
a first volume client and a second volume client; and
one or more physical block devices;
wherein the volume server is configured to:
   aggregate storage in the one or more physical block devices into a first logical volume and a second logical volume;
   make the first logical volume available to the first volume client using a first I/O error handling policy;
   make the second logical volume available to the second volume client using a second I/O error handling policy;
wherein the first I/O error handling policy differs from the second I/O error handling policy.

17. A method comprising:
aggregating storage in one or more physical block devices into a logical volume;
making the logical volume available to a first volume client using a first I/O error handling policy; and
making the logical volume available to a second volume client using a second I/O error handling policy;
wherein the first I/O error handling policy differs from the second I/O error handling policy.

18. The method as recited in claim 17, wherein each of the first and second I/O error handling policies includes a routing policy.

19. The method as recited in claim 17, wherein each of the first and second I/O error handling policies includes a detach policy.

20. The method as recited in claim 19, wherein each of the first and second I/O error handling policies includes a routing policy.

21. A computer-readable medium comprising program instructions,
wherein the program instructions are executable to:
   aggregate storage in one or more physical block devices into a logical volume;

make the logical volume available to a first volume client using a first I/O error handling policy;

make the logical volume available to a second volume client using a second I/O error handling policy;

wherein the first I/O error handling policy differs from the second I/O error handling policy.

22. The computer-readable medium as recited in claim 21, wherein each of the first and second I/O error handling policies includes a routing policy.

23. The computer-readable medium as recited in claim 21, wherein each of the first and second I/O error handling policies includes a detach policy.

24. The computer-readable medium as recited in claim 23, wherein each of the first and second I/O error handling policies includes a routing policy.

* * * * *